ELECTRONIC EQUIPMENT COOLING MEANS

Filed April 13, 1949 2 Sheets-Sheet 1

INVENTOR.
ALBERT D. GREENE
BY Wade Koontz
ATTORNEY
and
H. H. Losche
AGENT

ELECTRONIC EQUIPMENT COOLING MEANS

Filed April 13, 1949 2 Sheets-Sheet 2

INVENTOR.
ALBERT D. GREENE
BY Wade Koontz
ATTORNEY
and
H. H. Losche
AGENT

Patented June 23, 1953

2,643,282

UNITED STATES PATENT OFFICE 2,643,282

ELECTRONIC EQUIPMENT COOLING MEANS

Albert D. Greene, Alpha, Ohio

Application April 13, 1949, Serial No. 87,321

12 Claims. (Cl. 174—15)

(Granted under Title 35, U. S. Code (1952), sec. 266)

The invention described herein may be manufactured and used by or for the United States Government for governmental purposes without payment to me of any royalty thereon.

This invention relates to direct evaporative refrigeration of various component parts or assemblies of electronic circuit elements to maintain a regulated temperature within optimal functional limits of such elements.

The problem of cooling heat generating electronic circuit elements assumes increased importance as more exacting demands upon the conventional cooling systems are made by equipment designs which demand all or in part a wider range of ambient air temperature, higher altitudes, higher power, higher voltage, higher frequency, lighter weight, smaller size, and more compact and hermetically sealed assemblies. It has been common practice to cool specific electronic circuit elements by air blowers and sometimes with supplementary liquid circulating systems but such means are not satisfactory for cooling electronic circuit elements following the trend above named. Air cooling systems are proving inadequate because of the ever present obstruction to the air flow, low specific heat of air per unit volume, low density of air at high altitudes and unavoidable heating of surrounding electronic circuit elements which are themselves not heat generating. When a supplementary liquid circulating system is employed, it must depend ultimately on air cooling and likewise has the above noted disadvantages of a purely air cooling system. A large percentage of electronic circuit element failures are attributable to excessive heating of these individual elements. Corona and voltage breakdown are types of failures encouraged by high temperature low density air dielectric. Maintaining atmospheric or higher pressure by sealing reduces corona and voltage breakdown but complicates the cooling problem many fold.

In accordance with this invention, a new approach is made to the problem of cooling electronic circuit elements of electronic equipment. Years of experience of the refrigeration industry has demonstrated the practicality of cooling by direct evaporation of liquid refrigerants under controlled conditions. In the present invention, a liquid refrigerant, methylene chloride and Freon 113 for examples, is used in direct contact with heat producing electronic circuit elements of electronic equipment assemblies in a container or case to utilize the high B. t. u. cooling capacity of the boiling or latent heat of vaporization of the refrigerant for transferring heat injurious to electronic circuit elements to points of harmless dissipation. The two above named refrigerants are preferred since they have characteristics very favorable to the particular electronic circuit element cooling demand. That is, the refrigerant used should not be inflammable, should be nontoxic and not hazardous to life, should be chemically stable with a high critical temperature, should be noncorrosive and not a solvent for essential materials used in electronic assemblies, should have a high film coefficient and good wetting properties, should have a very low freezing point and a high boiling point, should have high liquid and vapor dielectric strength, and should have a high latent heat of vaporization. A refrigerant with low leak tendencies, one that can be easily detected for leaks and one that has good lubricating qualities, is also preferable. Freon 113 and methylene chloride possess most of these characteristics but are solvents for some of the insulating materials on ordinary electronic circuit elements. Although this is a disadvantage equally adequate nonaffected insulating materials are available and are used in carrying out this invention.

Electronic circuit elements comprising assemblies, as radio receivers, radio transmitters, radar etc., are wetted or actually immersed in a container of refrigerant as Freon 113, methylene chloride, or the like. In the operation of the electronic equipment, the heat from the heat generating elements is absorbed in the cooling medium which will boil off. The latent heat of vaporization of refrigerants is many times the corresponding specific heat and only a small volume of liquid refrigerant is required to absorb a large quantity of heat upon evaporation. Active boiling and resultant heat absorption is largely restricted to that liquid in direct contact with the heat generating electronic circuit elements. Also, the refrigerant is a good dielectric, being approximately three times that of air, and does not interfere with the various contacts and conductors making it possible to space the electronic circuit elements in very close relation. Many electronic circuit elements of smaller capacity may be used since their operating temperatures in a refrigerant would be much lower than operating temperatures in the air. That is, the electrical power ratings of elements such as resistors, transformers, choke coils, relay coils and tubes are entirely dependent upon the maximum temperature which the element can operate without electrical or mechanical failure. Obviously, if heat is continuously and effectively removed and the equilibrium temperature of the elements is maintained at a low figure, these elements may be overloaded or much smaller elements may be used for a given power rating. The more surface exposed or more "open" these elements are, the more effective is the heat absorption by the refrigerant and the more pronounced will be the possible size reduction or permissible power overload.

As above referred to, the electronic equipment may be immersed in the refrigerant and as evaporation of the refrigerant takes place a reserve supply may be so connected to replace the lost refrigerant, or a closed system may be used whereby the vaporized refrigerant may be condensed on the container walls or drawn off by pump or compressor means and condensed through heat exchanging means and re-used. The refrigerant may also be sprayed under pressure on the heat generating electronic circuit elements in proportion to the cooling requirements; vaporized by absorption of heat; and reconverted to the liquid state by the usual heat exchanger means. Another means of cooling electronic circuit elements is by capillary methods which employ wicking to transfer liquid refrigerant to the heat generating elements from a reserve supply. The elements may be fitted with capillary "socks" and the whole assembly of elements packed within some wicking material. This system has the advantage of permitting operation of the complete assembly in any position since the placement of the reserve supply is immaterial. The various cooling systems, or combinations of such systems, may be used with good results. Regardless of the cooling system used, the invention has for its object the provision for cooling electronic circuit elements by using a liquid refrigerant in direct wetting contact with the heat generating electronic circuit elements of the electronic assembly to absorb and conduct the heat away from these elements to maintain substantial temperature equilibrium of the electronic assembly whereby the electronic circuit elements are not affected by atmospheric temperature or pressure changes and are reduced in size and weight.

Other objects and advantages will become more apparent as the description proceeds when taken in view of the accompanying drawings, in which.

Figure 1:
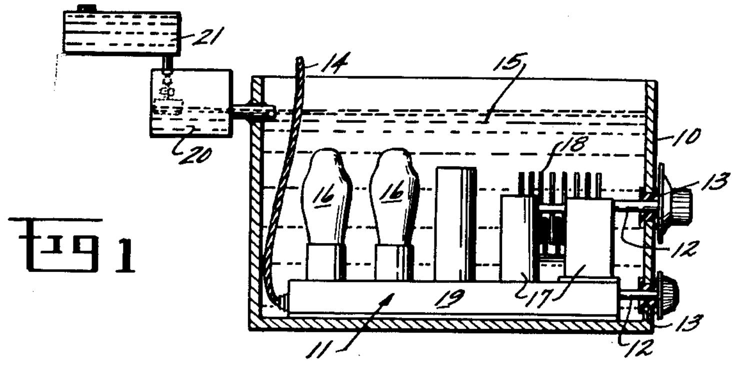
Fig. 1 illustrates diagrammatically and sectionally an electronic assembly immersed in a refrigerant for open air evaporative cooling in accordance with the invention.

Referring now to Fig. 1 in particular, there is shown a liquid-tight open top container 10 in which is placed some electronic equipment 11 to be used, which may be in the nature of a transmitter, a receiver, a radar set, or any other electronic assembly including heat generating elements to be cooled. Controllable elements as variable condensers, volume controls, and the like, are operated through shafts, as represented at 12, extending through the container wall. The shafts 12 are all sealed against fluid leakage by shaft seals 13 of any well known type. Power cables, antennas, and similar conductors 14, necessary to connect the electronic assembly to external devices, may extend through the container wall and be sealed against fluid leakage, or just passed over the top of the case or container 10 as illustrated. The container 10 is filled with a refrigerant 15 to cover all the electronic circuit elements as the various tubes 16, transformers 17 and variable condensers 18 as well as enveloping all the various capacitors, resistors, chokes, etc. within the base 19 normally existent in electronic equipment. The level of the refrigerant 15 is maintained by a float valve 20, or similar operating valve of well known construction, in a fluid conductor between a refrigerant reserve tank 21 and the electronic assembly container 10. The refrigerant and the insulation and materials of the electronic equipment are chosen such that the refrigerant will not act as a solvent of the insulating material or as a corrosive agent. It is also obvious that the refrigerant should not be inflammable or explosive. A refrigerant which is toxic or hazardous to life would be very objectionable from the standpoint of operation and maintenance of the equipment. Chemical stability under all conditions imposed by use is an absolute necessity. It must not deteriorate with age or decompose with electrical discharge and high temperature. It must be a good wetting agent, effectively coming into intimate contact with the surfaces to be cooled. Fortunately, most refrigerants are good in this respect. The freezing point should be below any anticipated operational or storage temperature and the boiling point should be above room temperature, preferably around 40° C. at normal atmospheric pressure. A dielectric strength at least equal to air at one atmosphere is necessary to prevent corona and voltage breakdown with customary terminal spacing. While several refrigerants could be used satisfactorily, methylene chloride and Freon 113 have been found to closely approach the "ideal" refrigerant for cooling heat generating electronic circuit elements. These refrigerants have a reasonably high latent heat of vaporization which provides a correspondingly high cooling capacity per unit weight. It is advantageous to use a refrigerant with a high latent heat of vaporization allowing a lighter refrigerant charge to effect any given cooling requirement. Secondly, a high density refrigerant is desirable to conserve on volume displacement allowing smaller and lighter distribution lines and a smaller volume capacity pump, where used in a refrigerating system as will later be described. The dielectric strength of either methylene chloride or Freon 113 is almost three times that of air making it possible to position the electronic circuit elements very close together. The high cooling capacity of either of these refrigerants also permits size reduction or greater power overload of the electronic elements.

Figures 2, 3, 4, 5:
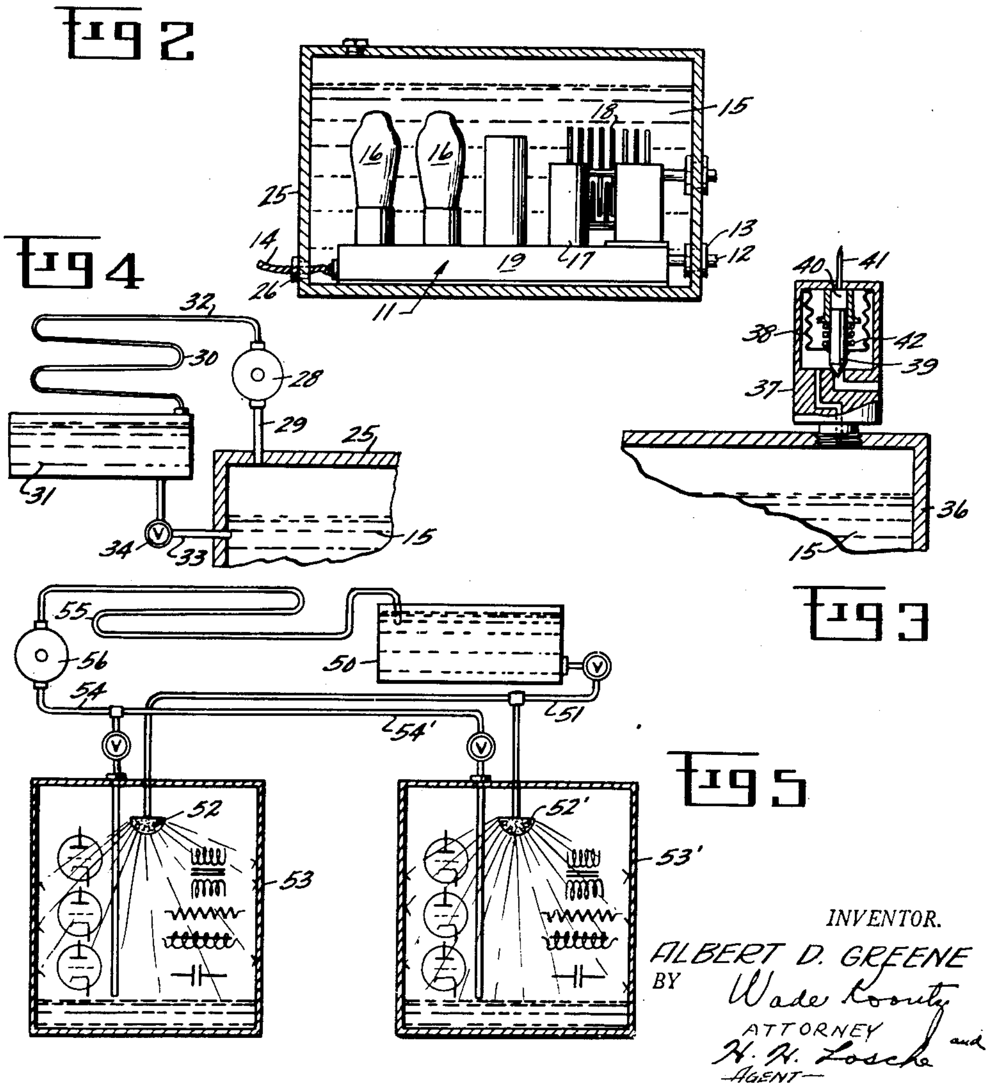
Fig. 2 illustrates diagrammatically and sectionally an electronic assembly sealed within a case and immersed in a refrigerant for evaporative cooling.
Fig. 3 shows a fragmentary cross-section of the container of case of the refrigerant and electronic equipment with a relief valve in the case for controlling the refrigerant vapor pressure.
Fig. 4 shows diagrammatically and in section a partial view of an electronic assembly immersed in a refrigerant of a closed refrigerating system.
Fig. 5 illustrates diagrammatically electronic equipment being cooled by spray wetting of the electronic circuit elements with a refrigerant.

Another very effective method of cooling heat generating electronic circuit elements of an electronic assembly is illustrated in Fig. 2 in which the electronic assembly 11 is sealed within a case or container 25. In this construction, the electrical conductors, or cable 14, must of necessity pass through the case and be sealed by a sealing means 26 in any well known construction. Vapor produced by boiling of the refrigerant in the process of cooling the heat generating electronic circuit elements will be condensed on the container wall above the liquid refrigerant to maintain a controlled operating temperature of the electronic assembly. The cooling characteristics of this system are determined by the chosen volume of the container for the refrigerant and the surface area of the container exposed to the atmosphere which in turn determines the pressure under which the refrigerant operates. The surface area of the container may be increased by the use of fins where considered expedient.

In some cases where the electronic equipment is expendable, as in guided missiles or the like to be destroyed after short operation, the refrigerating system may merely consist of a fluid-tight container 36 housing electronic equipment, as shown in a partial cut-away sectional view in Fig. 3, in which a pressure relief valve 37 is used to control the vapor pressure of the refrigerant. As evaporation of the refrigerant takes place about the electronic circuit heat generating elements, the vapor pressure increases and vapor exhaust takes place through the valve 37. The valve 37 has a bellows member 38 sealed to the valve head 39 and the valve body forming a chamber 40 above the valve head. The chamber 40 is evacuated through the tube 41 which eliminates possibility of distortion of the bellows due to atmospheric temperature or pressure changes. A compensating spring 42 is used to supply the tension required to seat the valve head 39 at a predetermined pressure to provide predetermined working pressures and temperatures of the refrigerant. The container volume may be calculated such that sufficient refrigerant may be initially placed in the container to provide adequate wetting of the electronic circuit elements for a predetermined time or operation.

The electronic equipment container or case may also be closed to provide a closed refrigerating system as shown in the partial cut-away view in Fig. 4 in which the container 25 is sealed, as described for Fig. 2, against refrigerant leakage. A compressor or pump 28 is used to pump out the refrigerant vapor produced in the process of evaporative cooling of the heat generating electronic circuit elements through the fluid conduit 29. The pump forces the refrigerant through the heat exchanger 30 under pressure and thence into the receiver 31 through the fluid conduit 32. It is returned to liquid form by removal of heat through the agency of any conventional heat exchanger. The receiver 31 is connected to the electronic equipment container 25 by a fluid conduit 33 through the control valve 34. By this method, the vaporized refrigerant may be recovered for re-use and simultaneously regulate the system pressure and refrigerant operating temperature. Such a system is applicable to continuous operation and, where expedient or desirable, the compressor or pump may be placed within the electronic equipment container.

Another means of effective evaporative cooling of electronic equipment is diagrammatically shown in Fig. 5 in which the refrigerant is drawn from a receiver 50 through a fluid conduit 51 to a distributing head 52 within the electronic equipment container 53 inclosing the various electronic circuit elements, only diagrammatically shown therein. The distributing head 52 produces a spray of the liquid refrigerant over the heat generating electronic circuit elements and the excessive refrigerant drops to the bottom of the container. The vaporized refrigerant is pumped back into the receiver 50 through the conduit 54 and heat exchanger 55 by a pump or compressor 56 in a conventional manner common in refrigerating systems. The great heat absorption quality of the refrigerant makes spraying of the heat generating elements very effective since only wetting of these elements is necessary for evaporative cooling. This system has the advantages of selective cooling of the electronic circuit elements that are heat generating and further it is a simple matter to cool additional electronic circuit assemblies where desirable as shown by the additionally connected unit or assembly illustrated with the reference characters primed.

Figure 6:
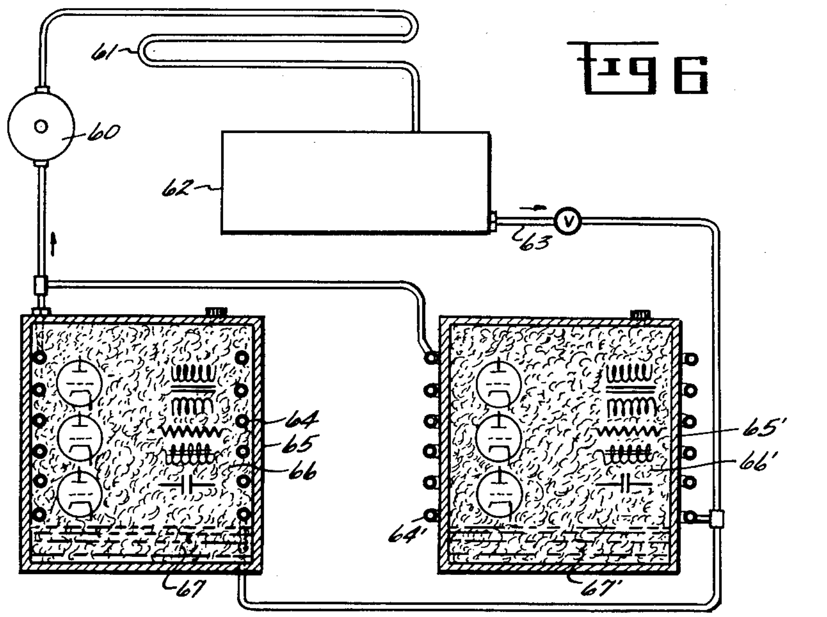
Fig. 6 illustrates diagrammatically the cooling of electronic circuit elements by wick wetting.

A still further modification of the invention comprises in surface wetting heat generating electronic circuit elements by wicking as diagrammatically illustrated in Fig. 6. A conventional cooling system is used having a pump 60, a heat exchanger 61 and a receiver 62. The cooling agent, which may be water, alcohol, Prestone, or the like, is conducted through a conduit 63 and a cooling coil 64 back through the pump 60. The cooling coil may be within the electronic equipment container as shown by the left container 65, or encircling the container as illustrated by 64′ on the right container 65′, whichever is more desirable for the particular application. The heat generating electronic circuit elements are fitted in "socks" (not shown) and the whole assembly packed within some wicking material 66. The wicking material 66 extends to the bottom of the container 65 below the electronic circuit elements. The lower portion of container 65 contains refrigerant 67 which, by capillary action, saturates the wicking material with refrigerant and consequently wets all the heat generating elements. The heat generated by the electronic circuit elements is absorbed by vaporization of the refrigerant which heat is removed by the cooling agent in the coils 64. The cooling coils 64′ must be used with a container that is a good conductor of heat, as most metals. This system has the advantage of permitting operation of the electronic equipment in any position without employing baffle plates to hold the liquid reserve supply in any specified position. The number of electronic assemblies could be increased by connecting them in parallel in the cooling system requiring only a cooling system of increased capacity.

The last two modifications could very easily be combined such that a refrigerating system could provide liquid refrigerant to both spray dispensing head and cooling coils, or the wicking material may be sprayed to effect actual wetting of the heat generating electronic circuit elements.

Figure 7:
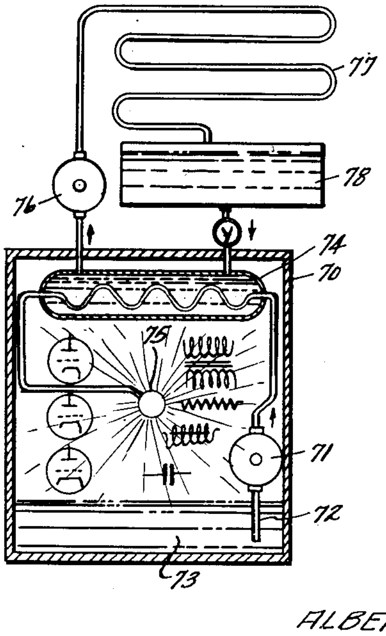
Fig. 7 diagrammatically illustrates the cooling of electronic circuit elements with a pressure refrigerating system within the case and a secondary cooling system exterior to the case.

It further may be desirable and practical to place all the parts of the refrigerating system, except the heat exchanger, illustrated in Fig. 5, within the electronic equipment container. Fig. 7 is referred to in order that this embodiment of the invention may be better understood. Within the electronic equipment container 70, which is sealed, is a compressor or pump 71 having a suction pipe 72 for drawing liquid refrigerant from the liquid refrigerant reserve 73 in the bottom of the container. The pump forces the refrigerant through a primary heat exchanger 74 to be discharged onto the electronic circuit elements through the spray nozzle 75. The primary heat exchanger 74 is cooled by some liquid cooling agent, as water, alcohol, Prestone, or the like, by the cooling action of a secondary cooling system consisting of a pump or compressor 76, a secondary heat exchanger 77 and a receiver 78, as is well known in the art. This method of cooling heat generating electronic circuit elements has the advantage of incorporating the electronic equipment and the primary refrigerating system in a single unit to which it is only necessary to attach the external secondary cooling system. It should also be obvious that wick wetting of the electronic circuit elements may be used in this embodiment, if desirable. The secondary cooling system could comprise of the use of coolant, as tap water, air, gasoline, etc.

In electronic equipment where magnetrons are used that require individual liquid or air cooling, the fluid conductors from these magnetrons may be extended through the electronic equipment container wall and be sealed therein in a manner well recognized in the art. These fluid conductors may be connected to separate air blowers, cooling liquid under pressure, or to the refrigerating system hereinbefore described for the above illustrations.

While I have illustrated and described preferred embodiments and features of my invention, it is to be understood that various modifications and changes may be made without departing from the spirit and scope of my invention and I desire to be limited only by the scope of the appended claims.

I claim:

1. A container, an electronic apparatus assembly in said container, said electronic apparatus assembly comprising a plurality of cooperating electronic circuit elements of diverse structural and electrical characteristics some of which generate heat when energized, a volatile liquid refrigerant having high dielectric strength and negligible corrosive effect on the structural materials of said electronic circuit elements, means for maintaining the pressure in said container at a value for which the boiling point of the refrigerant used is above the ambient temperature of the container and below the least of the maximum allowable operating temperatures of said electronic circuit elements, means for wetting said electronic circuit elements with the liquid refrigerant, means for electrically coupling said electronic apparatus assembly to circuit external to said container, and means for mechanically coupling any of said electronic circuit elements that are adjustable to adjusting devices external to said container.

2. Apparatus as claimed in claim 1 in which said container is sealed to exclude the atmosphere, whereby the strength of the dielectric between points of relatively high potential is maintained substantially constant and independent of atmospheric changes.

3. Apparatus as claimed in claim 1 in which said container is sealed to exclude the atmosphere and to retain the refrigerant and in which said means for maintaining the pressure in said container at the specified value comprises means for condensing the evaporated refrigerant for reuse.

4. Apparatus as claimed in claim 1 in which said means for wetting said electronic circuit elements with the liquid refrigerant comprises means for immersing said assembly including said elements in said liquid refrigerant, whereby the temperatures of said heat generating electronic circuit elements are kept within safe limits and the strength of the dielectric between points of relatively high potential in said assembly is maintained substantially constant and independent of atmospheric changes.

5. Apparatus as claimed in claim 4 in which said container is sealed to exclude the atmosphere and to retain the refrigerant and offers sufficient cooling surface to the evaporated refrigerant to effect condensation thereof.

6. Apparatus as claimed in claim 1 in which said container is sealed to exclude the atmosphere and to retain the refrigerant, in which said means for wetting said electronic circuit elements with the liquid refrigerant comprises means for spraying said liquid refrigerant onto said electronic circuit elements, and in which said means for maintaining the pressure in said container at the specified value comprises means for condensing the evaporated refrigerant and for applying the resulting liquid refrigerant to the said spraying means.

7. A sealed container, an electronic apparatus assembly in said container, said assembly comprising a plurality of cooperating electronic circuit elements of diverse structural and electrical characteristics some of which generate heat when energized, a volatile liquid refrigerant having high dielectric strength and negligible corrosive effect on the structural materials of said electronic circuit elements, means for spraying said liquid refrigerant onto said electronic circuit elements for cooling same by evaporation, heat exchanging means in said container, means for collecting gaseous refrigerant and excess liquid refrigerant in said container and for forcing these under pressure through said heat exchanging means to said spraying means, means for passing a cooling medium through said heat exchanger from a source external to said container to effect condensation of the gaseous refrigerant by removal of heat therefrom, means for electrically coupling said electronic apparatus assembly to circuits external to said container, and means for mechanically coupling any of said electronic circuit elements that are adjustable to adjusting devices external to said container.

8. Evaporative cooling by refrigerant of heat generating electronic circuit elements in electronic equipment for maintaining regulated temperature operation of the electronic circuit elements therein favorable to efficient electronic equipment operation comprising; closely spaced electronic circuit elements, some of which are heat generating and all of which are chemically inert to refrigerants; a case housing said electronic circuit elements, said electronic circuit elements including some adjustable members having control shafts extending through said case and sealed at said case by shaft seals against fluid leakage for controlled operation of said electronic equipment; a liquid refrigerant in said case having a high dielectric strength; and means for surface wetting said heat generating electronic circuit elements with said refrigerant which refrigerant evaporates upon heat absorption to carry away the heat generated by said heat generating electronic circuit elements whereby the electronic circuit elements are maintained at a regulated efficient operating temperature in their close juxtaposed relation, said surface wetting means including spray nozzle means in said case directed to spray liquid refrigerant on said heat generating electronic circuit elements and means for forcing said liquid refrigerant in said case through said spray nozzle means.

9. Evaporative cooling by refrigerant of heat generating electronic circuit elements in electronic equipment for maintaining regulated temperature operation of the electronic circuit elements therein favorable to efficient electronic equipment operation comprising; closely spaced electronic circuit elements, some of which are heat generating and all of which are chemically inert to refrigerants; a case housing said electronic circuit elements, said electronic circuit elements including some adjustable members having control shafts extending through said case and sealed at said case by shaft seals against fluid leakage for controlled operation of said electronic equipment; a liquid refrigerant in said case having a high dielectric strength; and means for surface wetting said heat generating electronic circuit elements with said refrigerant which refrigerant evaporates upon heat absorption to carry away the heat generated by said heat generating electronic circuit elements whereby the electronic circuit elements are maintained at a regulated efficient operating temperature in their close juxtaposed relation, said surface wetting means including spray nozzle means in said case directed to spray liquid refrigerant on said heat generating electronic circuit elements and means for forcing said liquid refrigerant in said case through said spray nozzle means comprising a compressor connected to draw refrigerant from said case and a heat exchanger for removing the heat from said refrigerant connected to said spray nozzle means.

10. Evaporative cooling by refrigerant of heat generating electronic circuit elements in electronic equipment for maintaining regulated temperature operation of the electronic circuit elements therein favorable to efficient electronic equipment operation comprising; closely spaced electronic circuit elements, some of which are heat generating and all of which are chemically inert to refrigerants; a case housing said electronic circuit elements, said electronic circuit elements including some adjustable members having control shafts extending through said case and sealed at said case by shaft seals against fluid leakage for controlled operation of said electronic equipment; a liquid refrigerant in said case having a high dielectric strength; and means for surface wetting said heat generating electronic circuit elements with said refrigerant which refrigerant evaporates upon heat absorption to carry away the heat generated by said heat generating electronic circuit elements whereby the electronic circuit elements are maintained at a regulated efficient operating temperature in their close juxtaposed relation, said surface wetting means including a wicking material enveloping all of said heat generating electronic circuit elements and extending into said liquid refrigerant transferring liquid refrigerant by capillary action through all said wicking material to wet said circuit elements.

11. Evaporative cooling by refrigerant of heat generating electronic circuit elements in electronic equipment for maintaining regulated temperature operation of the electronic circuit elements therein favorable to efficient electronic equipment operation comprising; closely spaced electronic circuit elements, some of which are heat generating and all of which are chemically inert to refrigerants; a case housing said electronic circuit elements, said electronic circuit elements including some adjustable members having control shafts extending through said case and sealed at said case by shaft seals against fluid leakage for controlled operation of said electronic equipment; a liquid refrigerant in said case having a high dielectric strength; and means for surface wetting said heat generating electronic circuit elements with said refrigerant which refrigerant evaporates upon heat absorption to carry away the heat generated by said heat generating electronic circuit elements whereby the electronic circuit elements are maintained at a regulated efficient operating temperature in their close juxtaposed relation, said surface wetting means including a wicking material enveloping all of said heat generating electronic circuit elements and extending into said liquid refrigerant transferring liquid refrigerant by capillary action through all said wicking material to wet said electronic circuit elements, and means including a secondary cooling system having cooling coils thereof in thermal contact with said wicking material for removing the heat in said refrigerant absorbed from the heat generating elements.

12. Evaporative cooling by refrigerant of heat generating electronic circuit elements in electronic equipment for maintaining regulated temperature operation of the electronic circuit elements therein favorable to efficient electronic operation comprising; closely spaced electronic circuit elements of electronic equipment, some of which are heat generating and all of which are chemically inert to refrigerants; a hermetically sealed container housing said electronic circuit elements, some of said electronic circuit elements being adjustable and having actuatable shafts extending through said container and hermetically sealed at said container by shaft seals against fluid leakage, a liquid refrigerant in said container having a high dielectric strength; a compressor in said container constituted and arranged to pump said refrigerant through a primary liquid heat exchanger and spray nozzle means to effect surface wetting of said heat generating electronic circuit elements; and means for passing a cooling liquid from an external source through hermetically sealed passages through said container to said primary heat exchanger for removing the heat absorbed in said refrigerant from said heat generating electronic circuit elements.

ALBERT D. GREENE.

References Cited in the file of this patent

UNITED STATES PATENTS

| Number | Name | Date |
| --- | --- | --- |
| 513,421 | Rowland | Jan. 23, 1854 |
| 927,571 | Merralls | July 13, 1909 |
| 1,284,964 | Anderson | Nov. 19, 1918 |
| 1,334,041 | Lindstrom | Mar. 16, 1920 |
| 1,539,837 | Hayes | June 2, 1925 |
| 1,884,429 | Warner | Oct. 25, 1932 |
| 1,898,758 | Bottoms | Feb. 21, 1933 |
| 1,904,771 | Hentschel | Apr. 18, 1933 |
| 2,083,611 | Marshall | June 15, 1937 |
| 2,187,011 | Braden | Jan. 16, 1940 |
| 2,250,648 | Phillip | July 29, 1941 |
| 2,342,689 | Pennington | Feb. 29, 1944 |
| 2,440,930 | Camilli et al. | May 4, 1948 |
| 2,484,542 | Atwood | Oct. 11, 1949 |
| 2,502,527 | McFarlan | Apr. 4, 1950 |